(12) United States Patent
Eslambolchi et al.

(10) Patent No.: US 6,205,397 B1
(45) Date of Patent: Mar. 20, 2001

(54) ROUTE ENGINEERING TECHNIQUE

(75) Inventors: Hossein Eslambolchi, Basking Ridge, NJ (US); John Sinclair Huffman, Conyers, GA (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/366,244

(22) Filed: Aug. 3, 1999

(51) Int. Cl.[7] .............................. H04B 7/185; G01C 21/02
(52) U.S. Cl. ...................... 701/201; 701/213; 342/357.06
(58) Field of Search ................................... 701/201, 209, 701/210, 213; 342/357.06, 357.13

(56) References Cited

U.S. PATENT DOCUMENTS

| | | | |
|---|---|---|---|
| 5,119,317 | * 6/1992 | Narikawa et al. | 364/512 |
| 5,504,685 | * 4/1996 | Wapner | 364/443 |
| 5,691,903 | * 11/1997 | Racette, III | 364/449.1 |
| 5,720,354 | 2/1998 | Stump et al. . | |
| 5,904,210 | 5/1999 | Stump et al. . | |

OTHER PUBLICATIONS

West et al.; Terrain based routing of distribution cables; IEEE–Computer Applications in Power; vol. 10, iss. 1; Jan. 1997; pp. 42–26.*

* cited by examiner

*Primary Examiner*—Michael J. Zanelli
(74) *Attorney, Agent, or Firm*—Robert B. Levy

(57) ABSTRACT

A mapping system (10) serves to automatically map a route (13) for a utility conveyance (12) by first establishing the starting and end points (14 and 16) between which the conveyance will run. After establishing the starting and end points, the system automatically determines whether an available right-of-way exists that encompasses the starting and endpoints. If an available right of way exists, the system maps the route along the available right-of-way. After mapping the route, the system automatically identifies any obstacles (39, 40) that lie along the route. The system may also determine whether it is possible to modify the automatically mapped route to avoid such obstacles, and if so, then re-mapping the route accordingly.

14 Claims, 2 Drawing Sheets

ROUTE ENGINEERING TECHNIQUE

TECHNICAL FIELD

This invention relates to a technique for automatically routing a utility conveyance, such as a pipe or cable, between a starting point and endpoint to avoid known obstructions.

BACKGROUND ART

Utilities that provide water, gas and sewer services typically maintain large networks of pipes most if not all of which are buried underground. In a similar fashion, electrical utilities and providers of telecommunications services, such as AT&T, maintain vast networks of cables, most of which are also buried underground. Increasing demand requires providers of gas, electric, water and telephone service to continually install new pipes and cables (hereinafter, "utility conveyances") to meet customer needs. Installation of a new buried conveyance, such as a fiber optic cable in the case of a telecommunications service provider, is not a trivial task. First, an engineer must obtain a physical map of the area encompassing the starting point and endpoint for the cable. Thereafter, the engineer must decide on a route, taking into account the availability of existing right-of-ways and the ability to obtain new right-of ways, as necessary. Having selected a potential route, the cable engineer must take into account any obstacles, such as rivers, lakes, and streets, for example, as well as any existing utility conveyances running along the proposed route. Once having selected a proposed, the engineer will actually walk, or otherwise traverse the route as a last check before installation commences.

The process of engineering a route for a buried utility conveyance is very tedious, requiring significant manual effort by the engineer to scrutinize the map in order lay out the proposed route while taking into account various obstacles. Moreover, the accuracy of the proposed route depends in large measure on the accuracy of the physical map used by the engineer to select the route. While great care is taken to accurately map existing obstacles along the proposed right-of-way of a planned cable or pipe, inaccuracies can and do occur, adversely affecting the proposed route.

Thus, there is a need for a technique for facilitating route engineering of a buried underground utility conveyance.

BRIEF SUMMARY OF THE INVENTION

Briefly, the present invention provides a method for automatically routing a utility conveyance. The method commences upon the selection of a starting point and endpoint between which the conveyance is to run. Once the starting and endpoints are selected, a determination is made automatically whether an available right-of-way exists between the starting and endpoints. In practice, such a determination is made by establishing the Global Positioning Satellite Coordinates for the starting and endpoints, and then comparing the GPS coordinates of the available right-of-ways to the GPS coordinates of the starting and endpoints. If an available right-of-way exists between the starting and endpoints, then a route is automatically mapped along the available right-of-way. After automatically mapping a proposed route between the starting and endpoints, each obstacle that exists on the proposed route is automatically identified. In practice, the GPS coordinates of each obstacle are compared to those of the automatically mapped route. If the obstacle lies within the automatically mapped route, the obstacle is identified for further consideration.

DETAILED DESCRIPTION

Figure 1:
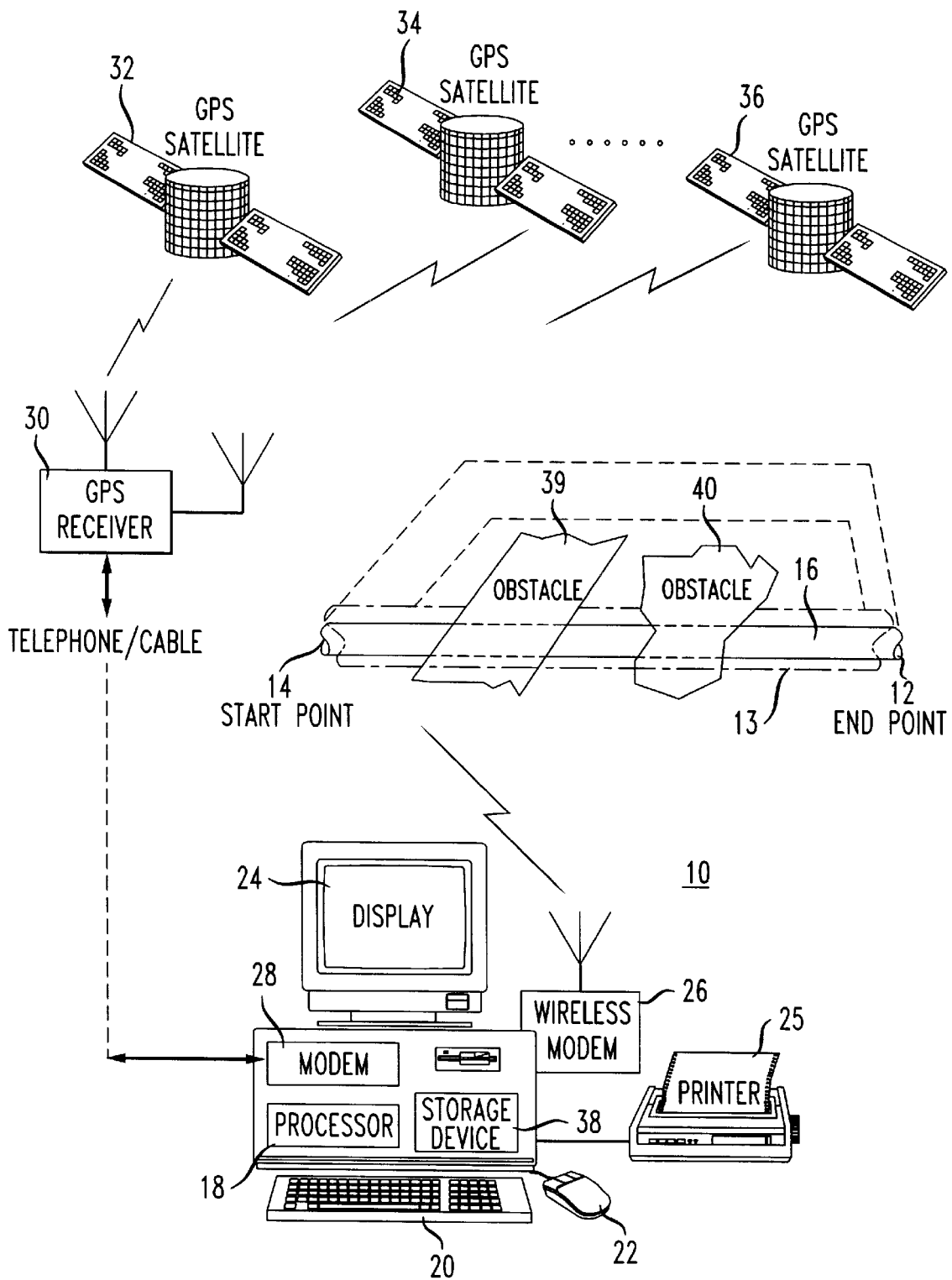
FIG. 1 shows a block schematic diagram of an apparatus for routing a utility conveyance in accordance with the invention.

FIG. 1 shows a bock schematic diagram of a system 10 in accordance with preferred embodiment of the invention for routing a utility conveyance 12, such as a pipe or cable, along a path 13 between a starting point 14 and endpoint 16. For example, in the case where the conveyance 12 comprises a fiber optic cable for burial underground, the starting and endpoints 14 and 16 may comprise spaced apart repeater stations, a central office and a repeater station, or any two facilities for terminating opposite ends of the cable.

The utility conveyance routing system 10 comprises a processor 18, typically, although not necessarily, a personal computer. Coupled to the processor 18 is a keyboard 20 through which an operator may enter data and/or instructions. Further, the processor 18 may receive data through a data entry device such as a graphing tablet or a mouse 22. A display device 24, such as monitor, displays output information produced by the processor 18. An output device 25, such as a printer or plotter, serves to provide a hard copy output of information supplied from the processor 18.

In the illustrated embodiment, the processor 18 enjoys a connection to at least one of a pair of modems 26 and 28. Modem 26 serves to communicate information between the processor 18 and an external device, such as a Global Positioning Satellite (GPS) receiver 30 via a wireless link. The modem 28 serves to communicate information between the processor 18 and the GPS receiver 30 via a wired link, such as a telephone line, or a cable television connection. The GPS receiver 30 is of a well-known design and serves to calculate its location coordinates from signals received via at least three orbiting geo-synchronous GPS satellites 32, 34 and 36. Note that the GPS receiver 30 may accept signals from as many as five or even eight GPS satellites in order to more accurately determine its location.

In the preferred embodiment, the GPS receiver 30 advantageously possesses the capability of transmitting its location via either a wireless link or a wired link to the processor 18 through the modems 26 and 28, respectively. To that end, the GPS receiver 30 may include a wireless transceiver (not shown) such as the type employed in cellular telephones or personal communications devices, or a modem for wired communications.

Note that the GPS receiver 30 need not possess any mechanism for directly communicating such location coordinates to the processor 18. Indeed, an operator could obtain the GPS location coordinates from the receiver 30 and enter such information to the processor 18 via the keyboard 20.

The GPS location information determined by the GPS receiver 30 and received by the processor 18 is stored in a mass storage device 38, typically a magnetic hard drive, or other type of mass storage device coupled to the processor 18. In addition to storing the GPS coordinates measured by the GPS receiver 30, the storage device 38 may also contain instructions for the processor 18, as well as other information, as described hereinafter, for routing the conveyance 12. Further, the storage device 38 will also include the GPS coordinates of existing obstacles 39 and 40, illustratively indicated as a street and lake, respectively.

Figure 2:
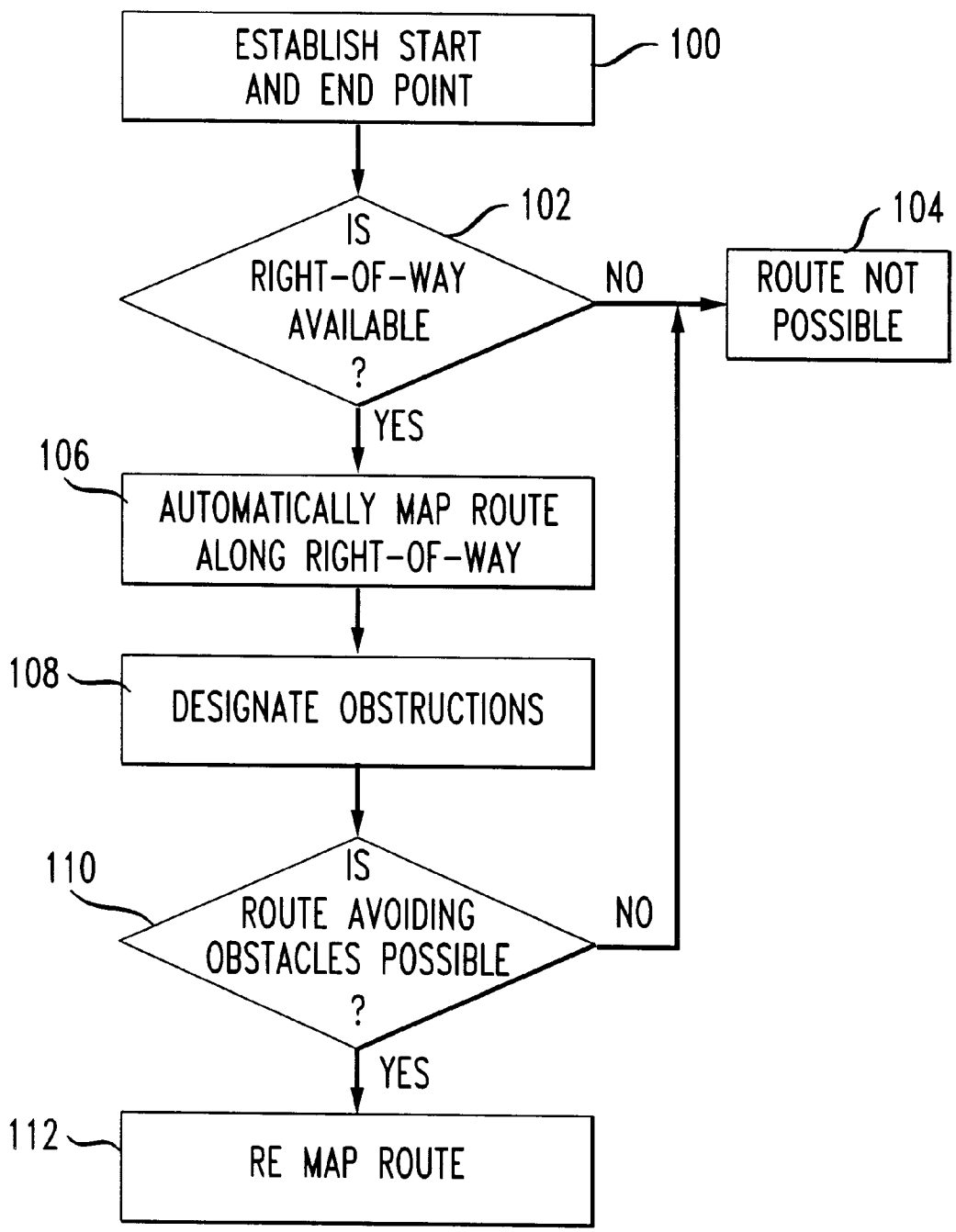
FIG. 2 is a flow chart of the steps executed by the apparatus of FIG. 1 to route the utility conveyance in accordance with the invention.

FIG. 2 depicts a flow chart of the steps executed in routing the conveyance 12 between the starting and endpoints 14 and 16 in accordance with the invention. Initially the starting and endpoints 12 and 14, respectively, of FIG. 1 are established (step 100). In practice, the step of establishing the starting and endpoints is accomplished by determining their respective GPS coordinates. In some instances, the GPS coordinates of the starting and end points have been previously measured and stored in the storage device 38 of FIG. 1 so that establishing the GPS coordinates is simply a matter of accessing the storage device and reading the information therefrom. If the GPS coordinates are not known apriori, then the coordinates are measured via the GPS receiver 30 of FIG. 1.

After establishing the starting and endpoints 12 and 14, respectively, a determination is made whether a right-of-way (e.g., path 13) exists between the start and endpoints along which the conveyance 12 can be routed. The availability of a right-of-way between the starting and endpoints 12 and 14 is determined by first establishing whether the entity seeking to route the conveyance has existing rights, such as an ownership interest or an easement to the area lying between the starting and endpoints. For example, many utilities often have rights (easements) allowing them to run conveyances in certain regions. To check whether a path is possible between the starting and endpoints for the conveyance, the processor 18 compares the GPS coordinates of the easement to those of the starting and endpoints to determine whether the starting and endpoints lie within such easement. Typically, the processor 18 makes that determination by first accessing the storage device 38 to obtain the stored GPS coordinates of the starting and endpoints, as well as the GPS coordinates of the available easements, assuming that such information was previously stored in the storage device. (Otherwise, it would be necessary to obtain the GPS coordinates via the GPS receiver 30.) If the entity seeking to route the conveyance lacks an available right-of-way, that is, the entity seeking to route the conveyance 12 of FIG. 1 does not already have or cannot secure the needed land rights, then the route is not possible (step 104) and process ends.

Assuming that a right-of-way of is available between the selected starting and endpoints, then the processor 18 automatically maps a route for the conveyance 12 along the right-of-way (step 106). In practice, the processor accomplishes such automatic mapping by first calculating the shortest path between the starting and end points (for example, using a least-square fit) and then determining whether the calculated path lies in the right of way. If so, the no further adjustments are necessary. Otherwise, the processor 18 my need to proceed iteratively. Using an iterative approach, the processor 18 would calculate the shortest path, and then map the route along a small portion (Δr) of the route along the calculated shortest path. Having mapped the portion Δr, the processor 18 checks whether the mapped portion lies within the available right-or-way. If so, the processor proceeds to map the next portion. Otherwise, the processor 18 varies the direction of the route to lie within the available right-of-way, and maps the next portion as just described.

Once the processor 18 has automatically mapped the route along the available right-of-way during step 106, the processor then identifies any obstacles along the just-mapped route (step 108). The processor 18 typically identifies the obstacles by accessing the storage device 38 to obtain the GPS coordinates for each known obstacle and then comparing its GPS coordinates to those of the mapped path. In other words, the processor 18 determines whether the GPS coordinates for each known obstacle lies within GPS coordinates for the area encompassed by the mapped path. If so, the processor 18 identifies the obstacles by providing an appropriate indication on the display of the mapped path (e.g., route 13 of FIG. 1) path provided on the display 24 of FIG. 1, as well as on any may printed by the printer 25 of FIG. 1.

In some instances, the automatically mapped path created by performing steps 100–108 is sufficient. However, once the processor 18 has identified the obstacles during step 108, the processor can readily determine during step 110 if it is possible to modify the just-obtained automatically mapped route to avoid the obstacles identified during step 108. The processor 18 checks whether it is possible to re-map the route during step 110 by determining whether a region exists around the obstacle, but sufficiently spaced therefrom while still lying within the available right-of-way. The processor does so iteratively by selecting successive regions that lie a prescribed distance from the obstacle and then comparing the GPS coordinates of each selected region to those of the selected the available right-of-way to determine if the selected region exists. If no such region exists, then it is not possible to avoid the obstacles, and the processor 118 indicates that a route is not possible (step 104). Otherwise, if a region exists outside the obstacle, yet inside the available right-of-way, the processor re-maps the route during step 112 by running the route through the selected region away from the obstacle. After the processor 18 re-maps the route, the process ends (step 114).

The foregoing describes a processor for automatically routing a path 13 for a conveyance 12 between a starting point 14 and an endpoint 16 by comparing the GPS coordinates for the starting and endpoints to GPS coordinates for the available right-of-way. If the right-of-way is available, then a route is automatically mapped route and any existing obstacles are then identified.

The above-described embodiments merely illustrate the principles of the invention. Those skilled in the art may make various modifications and changes that will embody the principles of the invention and fall within the spirit and scope thereof

What is claimed is:

1. A method for automatically routing a utility conveyance, comprising the steps of:

establishing a starting point and end point between which the conveyance is to run;

automatically determining if at least one of a plurality of available right-of-way exists between the starting point and end point; and if so, then automatically mapping a route for the conveyance between the starting point and end point along the available right-of-way; and automatically identifying any obstacles lying within the automatically mapped route.

2. The method according to claim 1 wherein the step of establishing the starting and end points includes the step of establishing Global Positioning Satellite (GPS) location coordinates for the start point and end point.

3. The method according to claim 2 wherein the step of automatically determining if an available right-of-way exists comprises the steps of:

establishing GPS location coordinates for all available rights-of-ways; and comparing the GPS coordinates for the start point and endpoint to determine if the start point and end points lie within one of said available rights-of-ways.

4. The method according to claim 2 wherein the step of identifying said obstacles includes the steps of:

comparing GPS location coordinates of each obstacle to GPS coordinates for said one available right-of-way, and if so, then indicating said each obstacle as lying within the mapped route.

5. The method according to claim 1 further including the step of determining whether it is possible to modify the automatically mapped route to overcome any identified obstacle.

6. The method according to claim 5 wherein the step of determining whether it is possible to modify the automatically mapped route includes the steps of:

determining whether a region spaced from the obstacle lies within the available right-of-way.

7. The method according to claim 6 further including the step of modifying the automatically mapped route so as to run within said region to avoid said obstacle.

8. The method according to claim 6 wherein said step of determining whether a region spaced from the obstacle lies within the available right-of-way further includes the steps of:

selecting successive regions spaced from the obstacle; and comparing the GPS location coordinates for said selected region to the GPS coordinates of the available right-of way.

9. A method for automatically routing a utility conveyance, comprising the steps of:

establishing a starting point and end point between which the conveyance is to run;

automatically determining if at least one of a plurality of available right-of-way exists between the starting point and end point; and if so, then automatically mapping a route for the conveyance between the starting point and end point along the available right-of-way; and automatically identifying any obstacles lying within the automatically mapped route;

determining whether it is possible to modify the automatically mapped route to overcome any identified obstacle, and if so, modifying the automatically mapped route to avoid each obstacle.

10. The method according to claim 9 wherein the step of establishing the starting and end points includes the step of establishing Global Positioning Satellite (GPS) location coordinates for the start point and end point.

11. The method according to claim 10 wherein the step of automatically determining if an available right-of-way exists comprises the steps of:

establishing GPS location coordinates for all available rights-of-ways; and comparing the GPS coordinates for the start point and endpoint to determine if the start point and end points lie within one of said available rights-of-ways.

12. The method according to claim 9 wherein the step of identifying said obstacles includes the steps of:

comparing GPS location coordinates of each obstacle to GPS coordinates for said one available right-of-way, and if so, then indicating said each obstacle as lying within the mapped route.

13. The method according to claim 9 wherein the step of determining whether it is possible to modify the automatically mapped route includes the steps of:

selecting successive regions spaced from the obstacle; and comparing GPS location coordinates for said selected region to GPS coordinates of the available right-of way to determine if said selected region lies within the available right-of-way.

14. The method according to claim 13 wherein the step of modifying the automatically mapped route includes the step of modifying the route to run through a selected region that lies within the available right-of-way.

* * * * *